(12) United States Patent
Kahle et al.

(10) Patent No.: US 6,543,862 B1
(45) Date of Patent: Apr. 8, 2003

(54) DRIVE WHEEL FOR TRACK APPARATUS

(75) Inventors: Glenn W. Kahle, Gibsonia, PA (US); David L. Juncker, Mt. Vernon; Jamsheed Reshad, Newburgh, both of IN (US)

(73) Assignee: AgTracks, Inc., Mount Vernon, IN (US)

( * ) Notice: Subject to any disclaimer, the term of this patent is extended or adjusted under 35 U.S.C. 154(b) by 0 days.

(21) Appl. No.: 09/627,862

(22) Filed: Jul. 28, 2000

(51) Int. Cl.⁷ .............................................. B62D 55/12
(52) U.S. Cl. ...................................... 305/195; 305/115
(58) Field of Search ................................. 305/115, 135, 305/178, 195, 199

(56) References Cited

U.S. PATENT DOCUMENTS

| | | | | |
|---|---|---|---|---|
| 1,852,197 A | * | 4/1932 | Wilson | |
| 1,853,308 A | * | 4/1932 | Humphreys et al. | |
| 1,922,357 A | * | 8/1933 | Divney et al. | |
| 2,592,541 A | * | 4/1952 | Curtis | |
| 3,359,044 A | * | 12/1967 | Boggs | ........................ 305/115 |
| 3,888,132 A | * | 6/1975 | Russ, Sr. | |
| 4,241,956 A | * | 12/1980 | Meisel, Jr. | |
| 4,616,883 A | * | 10/1986 | Edwards et al. | .............. 305/40 |
| 5,005,921 A | * | 4/1991 | Edwards et al. | |
| 5,240,084 A | | 8/1993 | Christianson | .............. 180/9.26 |
| 5,352,029 A | * | 10/1994 | Nagorcka | .................... 305/115 |
| 5,452,949 A | | 9/1995 | Kelderman | ................. 305/130 |
| 6,000,847 A | * | 12/1999 | Knight | ....................... 180/9.26 |
| 6,033,044 A | | 3/2000 | Brinkrolfl | .................... 305/194 |
| 6,074,025 A | * | 6/2000 | Junckner et al. | ............ 305/130 |

\* cited by examiner

*Primary Examiner*—Russell D. Stormer
(74) *Attorney, Agent, or Firm*—Jansson, Shupe & Munger, Ltd.

(57) ABSTRACT

A drive wheel is provided for mounting on a rotatable axle of a vehicle for driving a continuous flexible track. The flexible track includes an inner surface having a plurality of lugs and terminating at terminal surfaces. The drive wheel includes a central hub mountable on the axle of the vehicle for rotational movement therewith. First and second side-surfaces extend radially from the central hub and an outer rim interconnects the radial outer edges of the side-surfaces. It is intended that the terminal surfaces of the lugs engage the outer rim of the drive wheel such that the lugs are supported when the flexible track is driven by the drive wheel.

14 Claims, 11 Drawing Sheets

DRIVE WHEEL FOR TRACK APPARATUS

FIELD OF THE INVENTION

This invention relates generally to a track apparatus for a vehicle, and in particular, to a drive wheel for driving a flexible track of the track apparatus during operation of the same.

BACKGROUND OF THE INVENTION

Agricultural vehicles such as tractors, combines and the like are commonly used in agricultural fields for a variety of jobs. Typically, these agricultural vehicles incorporate tires on which the vehicles are supported. Since these types of large agricultural vehicles are quite heavy, the weight of agricultural vehicles are distributed to a relatively small area on the tires of the vehicles. As a result, the tires on the agricultural vehicles tend to compact the soil in the fields. Compacted soil discourages the growth of crops planted in the fields which need loose soil to flourish.

In addition, since agricultural fields are often wet due to rain or watering, agricultural vehicles which enter the fields become bogged down in the mud due to the fact that there is such a small area of the tire in contact with the soil. As such, it is highly desirable to develop a track system for vehicles which disburses the weight of the agricultural vehicle over a larger area so as to reduce the degree the soil in the agricultural fields is compacted and to provide a track with a larger surface area which contacts the soil so as to prevent the agricultural vehicle from becoming bogged down in mud in the fields.

A prior track system for vehicles is disclosed in Kelderman, U.S. Pat. No. 5,452,949, assigned to the Assignee of the present invention and incorporated herein by reference. The Kelderman '949 patent discloses a track suspension system for a vehicle having a frame and a continuous track. The drive wheel is attached to the frame for engaging and driving the continuous flexible track. The drive wheel has a plurality of drive projections or lugs disposed thereon which engage corresponding lugs extending from the inner surface of the flexible track. As the drive wheel rotates, it engages and drives the continuous flexible track. Since the drive projections of the drive wheel are rigid, repeated engagement of the drive projections with the lugs extending from the flexible track has a tendency to cause cracking of the continuous flexible track. Consequently, it would be highly desirable to provide a drive wheel which does not damage the flexible track after extended use.

OBJECTS OF THE INVENTION

Therefore it is a primary object and feature of the present invention to provide a drive wheel for engaging and driving a continuous flexible track of a track system for a vehicle.

It is a further object and feature of the present invention to provide a drive wheel of a track system for engaging and driving a continuous flexible track which does not damage the flexible track during extended use.

It is a still further object and feature of the present invention to provide a drive wheel of a track system for engaging and driving a continuous flexible track which is simple and inexpensive to manufacture.

SUMMARY OF THE INVENTION

In accordance with the present invention, a drive wheel mountable on a rotatable axle of a vehicle for driving a flexible track is provided. The flexible track has upper and lower lengths and an inner surface having a plurality of spaced lugs projecting therefrom. Each lug terminates at a generally flat terminal surface. The drive wheel includes a central hub mountable on the axle of the vehicle for rotational movement therewith. First and second side-surfaces extend radially from the central hub. The side-surfaces terminate at radially outer edges. An outer rim interconnects the outer edges of the side-surfaces. The outer rim is engageable with the terminal surfaces of the lugs.

It is contemplated to provide the outer rim with a plurality of spaced openings therein. The plurality of openings in the outer rim are circumferentially spaced about the central hub. In addition, a plurality of spaced drive lugs project radially from the outer rim. The plurality of drive lugs are circumferentially spaced about the central hub.

In accordance with a still further aspect of the present invention, a drive wheel mountable on a rotatable axle of a vehicle for driving a continuous flexible track is provided. The flexible track includes an inner surface having a lug projecting therefrom and terminating at a terminal surface. The drive wheel includes a central mounting portion mountable on the axle for rotational movement therewith. First and second side-surfaces project radially from the central mounting portion. Each side-surface has a radially outer edge. An outer rim interconnects the radially outer edges of the walls. First and second drive lugs project from the outer rim and define a lug-receiving gap therebetween for receiving the lug.

The outer rim may include a plurality of spaced openings therein. The plurality of openings in the outer rim are circumferentially spaced about the central mounting portion. Similarly, the drive lugs are circumferentially spaced about the central mounting portion. It is contemplated that the outer rim engage the terminal surface of the lug when the lug is in the lug receiving gap.

In accordance with a still further aspect of the present invention, a track apparatus mountable on a rotatable axle of the vehicle is provided. The track apparatus includes a continuous flexible track having upper and lower lengths and an inner surface having a plurality of spaced lugs projecting therefrom. Each lug terminates at a terminal surface. A drive wheel structure is mountable on the axle for driving the flexible track of the track apparatus. The drive wheel includes a central hub, first and second side-surfaces extending radially from the central hub and terminating at radially outer edges, and an outer rim interconnecting the outer edges of the side-surfaces for engaging terminal surfaces of the lugs.

The track apparatus may include a frame and a leading idler axle for rotatably supporting a leading idler wheel which engages the flexible track. The frame includes a leading idler support arm having a terminal end which defines a passageway for rotatably receiving the leading idler axle therethrough. The frame may include first and second side portions which define a drive wheel receipt well therebetween for receiving the drive wheel.

The outer rim of the drive wheel may include a plurality of spaced openings therein. The plurality of openings in the outer rim of the drive wheel are circumferentially spaced about the central hub. The drive wheel may also include a plurality of spaced drive lugs projecting radially from the outer rim. The plurality of drive lugs of the drive wheel are circumferentially spaced about the central hub.

BRIEF DESCRIPTION OF THE DRAWINGS

The drawings furnished herewith illustrate a preferred construction of the present invention in which the above advantages and features are clearly disclosed as well as others which will be readily from the following description of the illustrated embodiment.

DETAILED DESCRIPTION OF THE DRAWINGS

Figure 1:
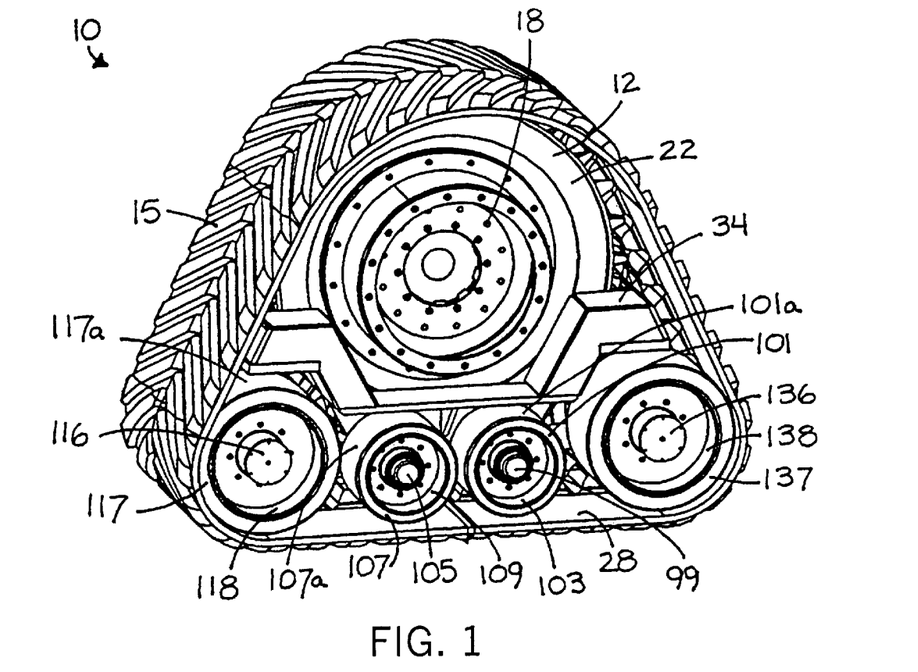
FIG. 1 is a rear isometric of a track system for a vehicle incorporating a drive wheel in accordance with the present invention.
Figure 2:
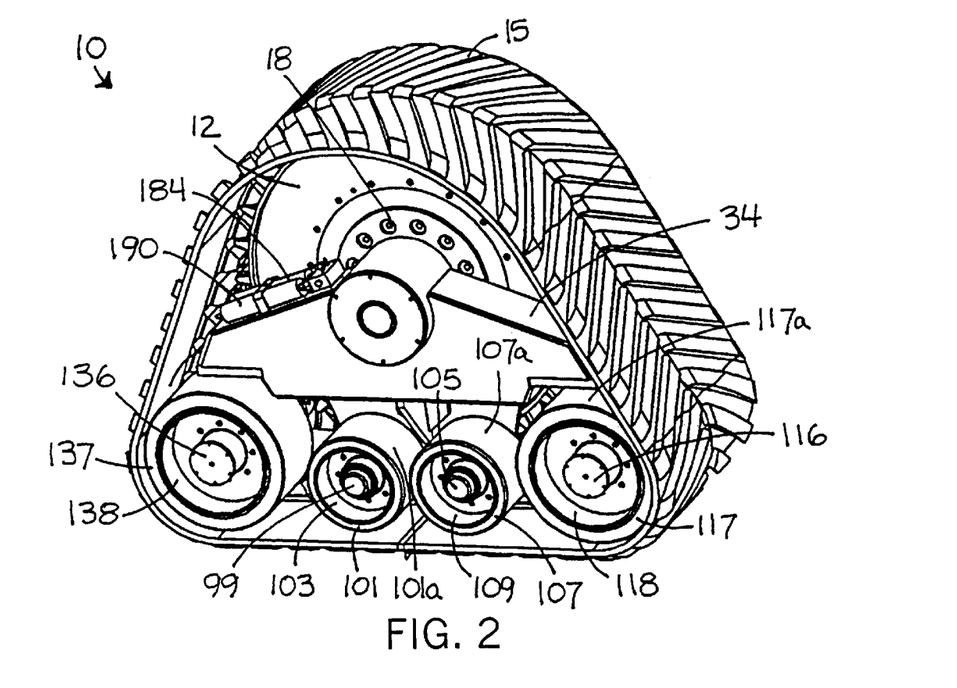
FIG. 2 is a front isometric view showing the track system of FIG. 1.

Referring to FIGS. 1–2, a track system is generally designated by the reference numeral 10. In a preferred embodiment, the track system 10 is mounted on an axle (not shown) of an agricultural vehicle such as a tractor or combine. However, it is contemplated as being within the scope of the present invention for track system 10 to be mounted on other types of vehicles such as trucks, automobiles, and the like.

Track system 10 includes a drive wheel 12 which mountable to the axle of a vehicle for rotational movement therewith in order to drive a flexible track 15. As best seen in FIG. 1, in the preferred embodiment, it is intended to mount track system 10 to a vehicle having a planetary axle. However, it is contemplated to mount track system 10 to a bar axle or other type of axle without deviating from the scope of the present invention.

Referring to FIG. 2, drive wheel 12 includes a first set of circumferentially spaced attachment openings 18 therein which are aligned with corresponding openings formed in an attachment flange extending radially from the axle of the vehicle, as is conventional. Bolts extend through attachment openings 18 in drive wheel 12 and through corresponding openings in the attachment flange of the axle and are secured by corresponding nuts threaded on the ends thereof in order to interconnect the axle of the vehicle to drive wheel 12 so as to allow drive wheel 12 to rotate in unison with the axle of the vehicle.

Figure 3:
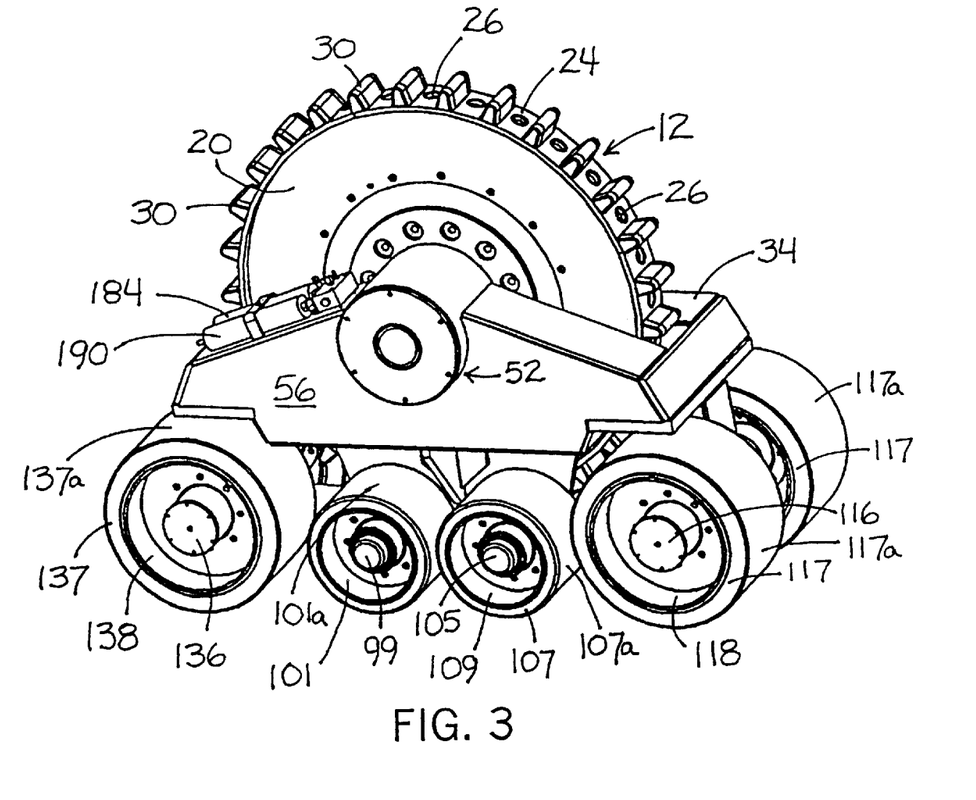
FIG. 3 is a front isometric view of the track system of FIG. 2 having the flexible track removed therefrom.

As best seen in FIGS. 1–3, drive wheel 12 includes an inner wall or side-surface 20 and an outer wall or side-surface 22 interconnected by a radially outer rim 24. Outer rim 24 includes a plurality of circumferentially spaced openings 26 therein for allowing debris which may accumulate on the inner surface 28 of flexible track 15 to pass therethrough. Outer rim 24 further includes an outer surface 29 having a plurality of circumferentially spaced drive lugs 30 projecting radially therefrom. As hereinafter described, drive lugs 30 are intended to engage corresponding lugs 32 projecting inwardly from the inner surface 28 of flexible track 15 in order to drive flexible track 15.

As best seen in FIGS. 13–19, track system 10 further includes frame 34 of a uni-body construction. Frame 34 includes first and second side portions 36 and 38, respectively, which define a drive wheel receipt well 40 therebetween for receiving drive wheel 12. Side portions 36 and 38 of frame 34 are interconnected by front and rear end panels 42 and 44, respectively.

Side portion 36 includes first and second upper panels 46 and 48, respectively, which extend laterally from outer surface 50 of generally tubular spindle hub 52 and a lower panel 53. Side panel 56 interconnects first sides 46a and 48a of upper panels 46 and 48, respectively, and first side 53a of lower panel 53. Side panel 54 projects from second sides 46b and 48b of upper panels 46 and 48, respectively, and is joined to second side 53b of lower panel 53. A support member 60 extends between outer surface 54b of side panel 54 and lower surface 62 of lower panel 53 to add strength and stability to side panel 54 during operation of track system 10. In the preferred embodiment, support member 60 takes the form of a gusset, but other configurations are possible without deviating from the scope of the present invention. Side panel 54 includes leading and trailing apertures 64 and 66, respectively, therethrough for receiving corresponding leading and trailing bogie axles, respectively, as hereinafter described. Reinforcement elements 64a and 66a may be mounted on outer surface 54b of side panel 54 about corresponding apertures 64 and 66, respectively, to reinforce apertures 64 and 66 and prevent deformation of the same by the bogie axles received therein.

Side portion 38 of frame 34 includes generally tubular, forward and rearward arms 70 and 72, respectively. Forward arm 70 includes a first end 74 which is joined to front end panel 42. Similarly, rearward arm 72 includes a first end 76 joined to rear end panel 44. Second ends 78 and 80 of forward and rearward arms 70 and 72, respectively, are interconnected to the upper surface 82 of a generally horizontal base plate 84. Base plate 84 includes an inner edge 86 directed towards drive wheel receipt well 40 and an outer edge 88. Side panel 90 depends from inner edge 86 of base plate 84 and includes leading and trailing apertures 92 and 94, respectively, therethrough for receiving corresponding leading and trailing bogie axles, as hereinafter described. Leading aperture 92 in side panel 90 of side portion 38 is axially aligned with leading aperture 64 in side panel 54 of side portion 36. Likewise, trailing aperture 94 in side panel 90 of side portion 38 is axially aligned with trailing aperture 66 in side panel 54 of side portion 36. Reinforcement elements 92a and 94a may be mounted on outer surface 90b of side panel 90 about corresponding apertures 92 and 94, respectively, to reinforce apertures 64 and 66 and prevent deformation of the same by the bogie axles received therein. Outer surface 90b of side panel 90 of side portion 38 is interconnected to the lower surface 98 of base plate 84 by a support structure 100 to add strength and stability to side panel 90. In the preferred embodiment, support member 100 takes the form of a gusset, but other configurations are possible without deviating from the scope of the present invention.

A leading bogie axle 99 extends through leading aperture 64 in side panel 54 and through leading aperture 92 in side panel 90. Leading bogie wheels 101 are mounted on rims 103, FIGS. 1–2, in a conventional manner which, in turn, are mounted on corresponding ends of leading bogie axle 99 in a conventional manner for rotational movement therewith. The outer surfaces 101a of leading bogie wheels 101 engage the inner surface 28 of flexible track 15. Similarly, a trailing bogie axle 105 extends through trailing aperture 66 in side panel 54 and through trailing aperture 94 in side panel 90. Trailing bogie wheels 107 are mounted on rims 109, FIGS. 1–2, in a conventional manner which, in turn, are mounted on opposite ends of trailing bogie axle 105 in conventional manner for rotational movement therewith. The outer surfaces 107a of trailing bogie wheels 107 engage the inner surface 28 of flexible track 15.

Inner surface 54a of side panel 54 of side portion 36 is interconnected to inner surface 90a by leading and trailing bogie axle shrouds 102 and 104, respectively. Leading bogie axle shroud 102 is generally arcuate in shape and has a first end positioned adjacent leading aperture 64 in side panel 54 of side portion 36 and a second opposite end 102b adjacent leading aperture 92 in side panel 90 of side portion 38 so as to partially surround leading bogie axle 99. First and second spaced mounting flanges 95 and 97 project from leading bogie axle shroud 102. Mounting flanges 95 and 97 include corresponding openings 95a and 97a, respectively, therein for reasons hereinafter described. Trailing bogie axle shroud 104 is arcuate in shape and includes a first end positioned adjacent trailing aperture 66 in side panel 54 of side portion 36 and a second end 104b positioned adjacent trailing aperture 94 in side panel 90 of side portion 38 so as to partially surround trailing bogie axle 105.

Frame 34 further includes a trailing idler axle support arm 110 which extends between trailing bogie axle shroud 104 and rear end panel 44. Trailing idler axle support arm 110 includes a generally tubular trailing idler axle support 112 having an inner surface 114 for rotatably supporting trailing idler axle 116. Trailing idler wheels 117 are mounted on rims 118, FIGS. 1–2, in a conventional manner which, in turn, are mounted on corresponding ends of trailing idler axle 116 in a conventional manner for rotational movement therewith. Trailing idler wheels 117 include radially outer surfaces 117a for engaging the inner surface 28 of flexible track 15.

Figure 5:
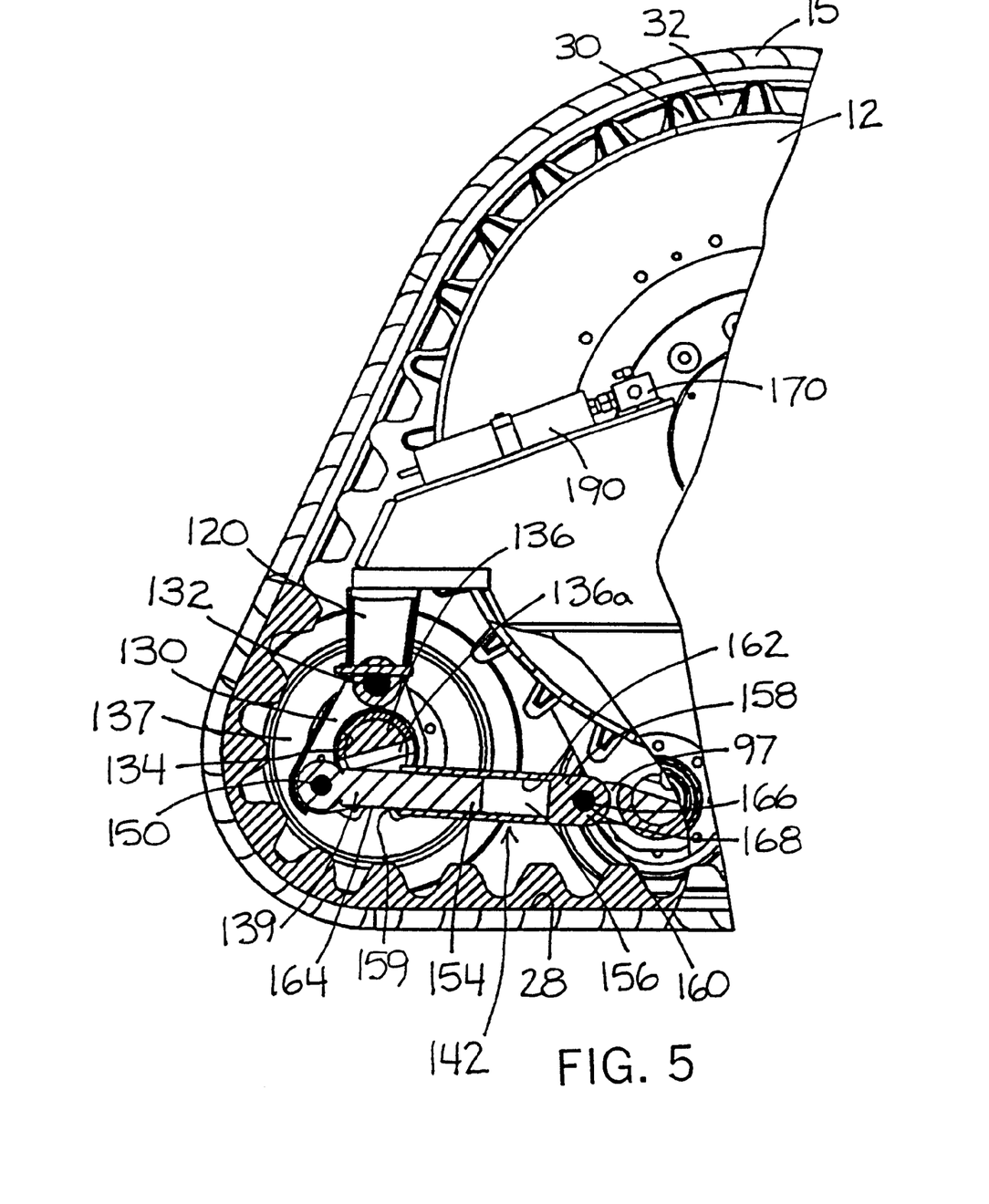
FIG. 5 is a front elevational view, partially-in-section, showing a portion of the track system of FIG. 4.
Figure 12A:
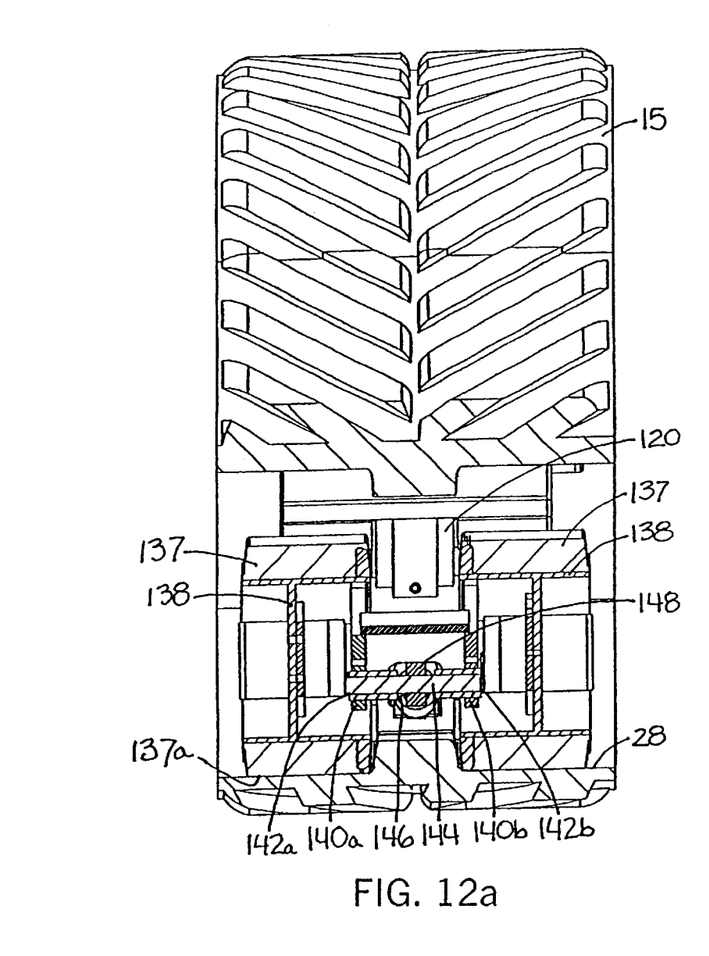
FIG. 12a is a cross-sectional view taken along line 12a—12a of FIG. 4.
Figure 12B:
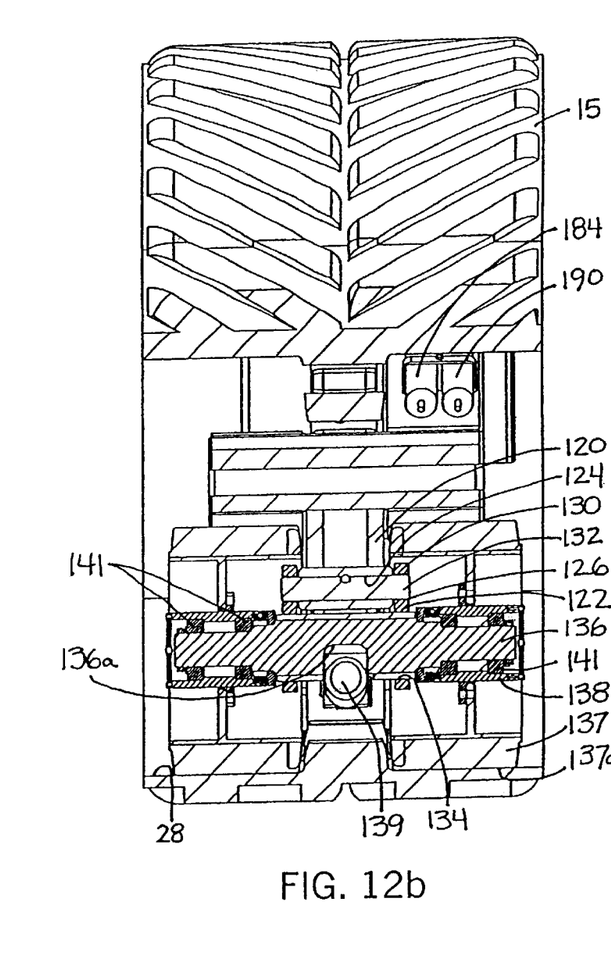
FIG. 12b is a cross-sectional view taken along line 12b—12b of FIG. 4.
Figure 13:
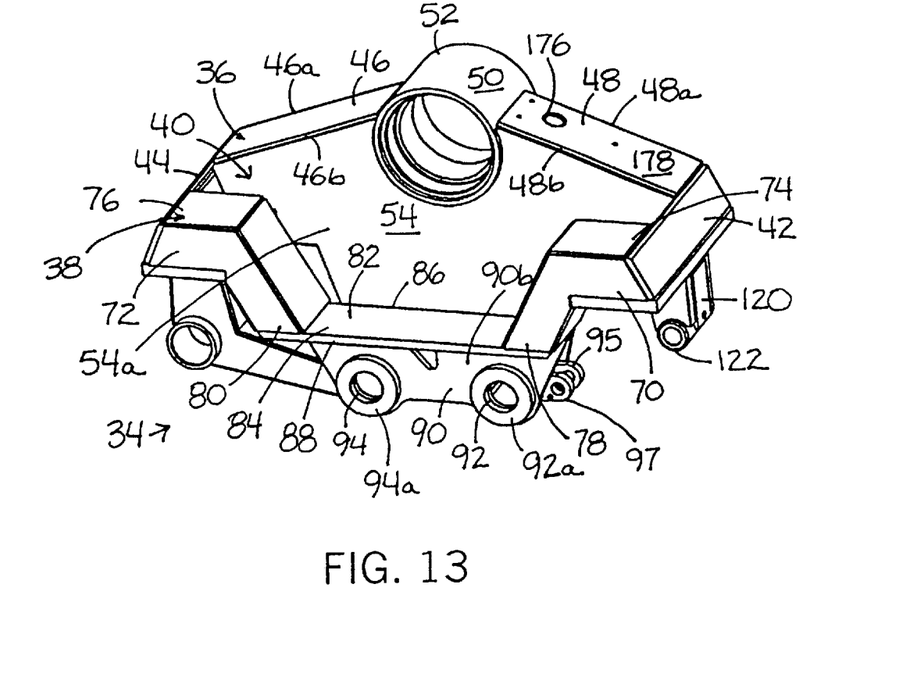
FIG. 13 is a rear isometric of a frame for the track system of FIG. 2.
Figure 14:
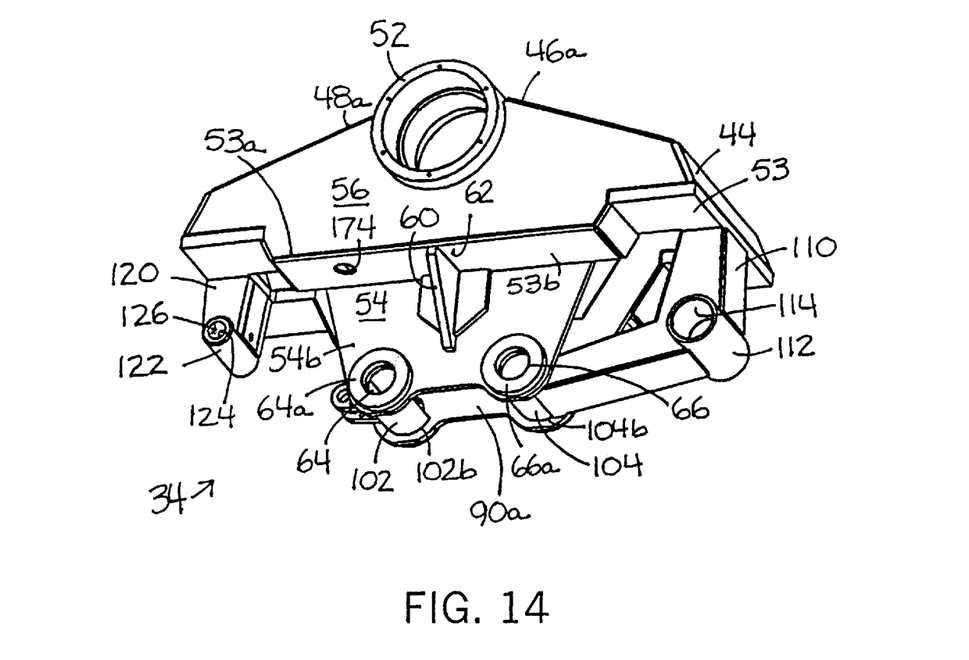
FIG. 14 is a front isometric of the frame for the track system of FIG. 2.
Figure 15:
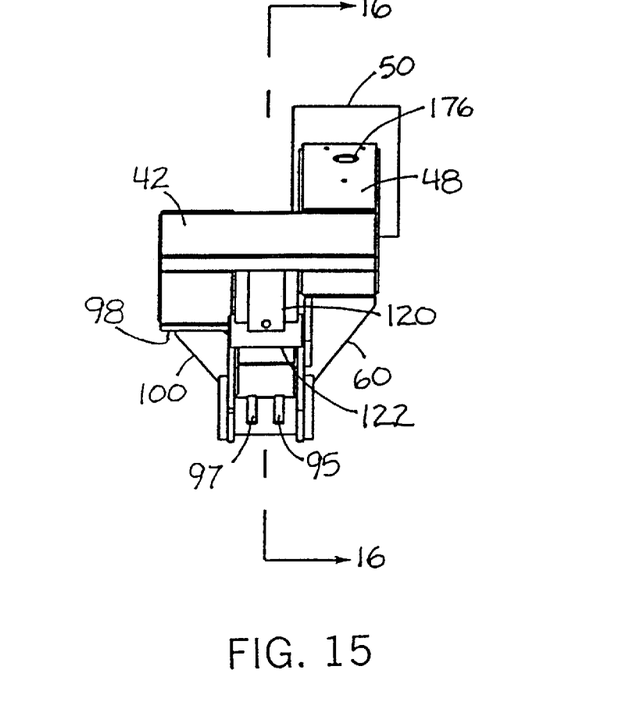
FIG. 15 is a side elevational view of the frame of FIG. 14.
Figure 16:
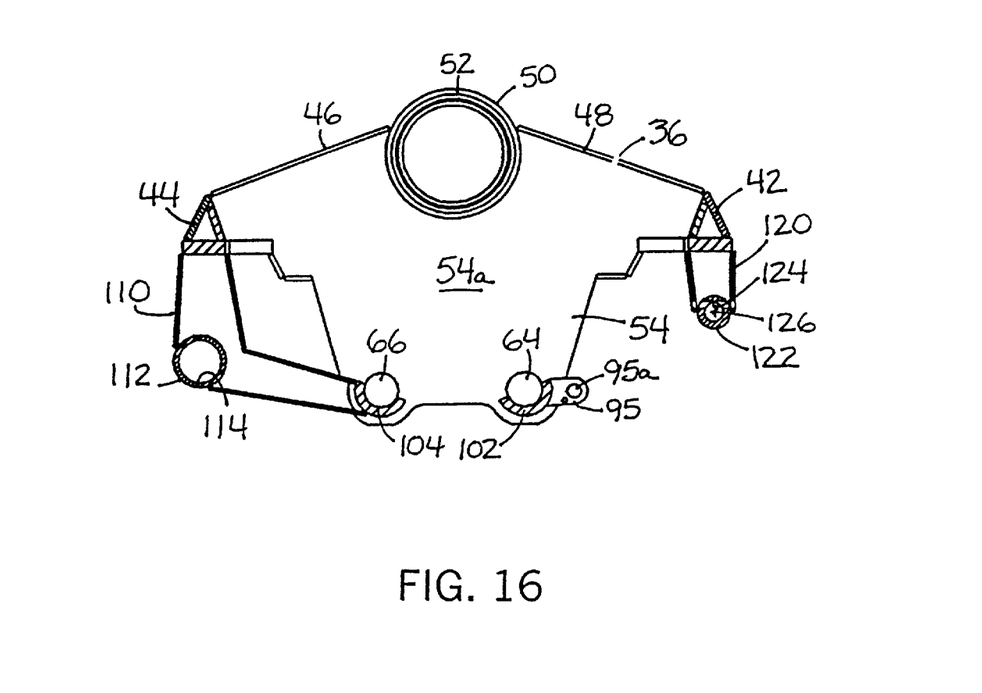
FIG. 16 is a cross-sectional view taken along line 16—16 of FIG. 15.
Figure 17:
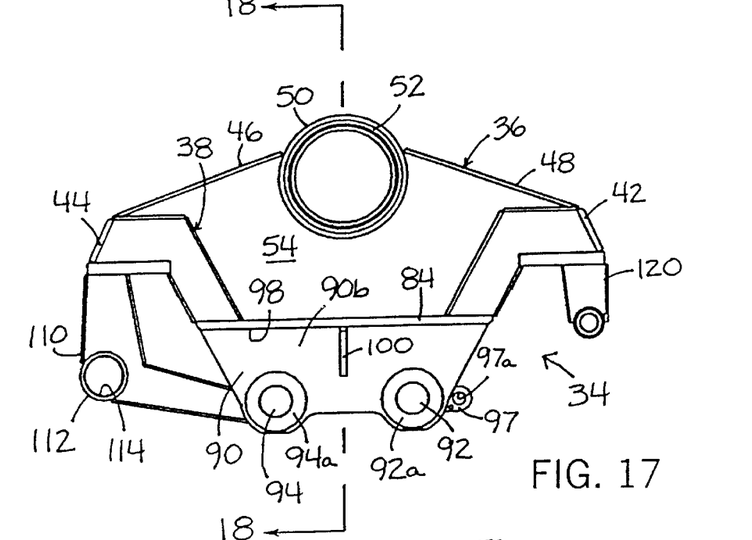
FIG. 17 is a front elevational view of the frame of FIG. 14.
Figure 18:
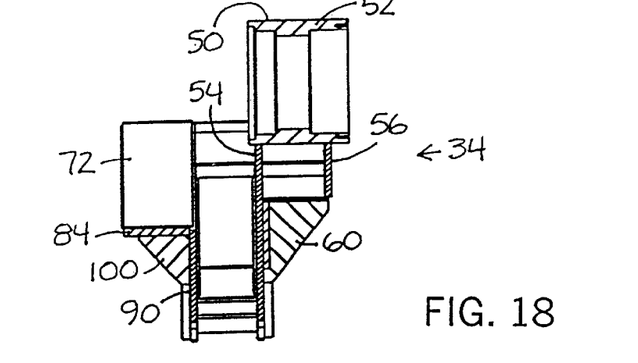
FIG. 18 is a cross-sectional view taken along line 18—18 of FIG. 17.
Figure 19:
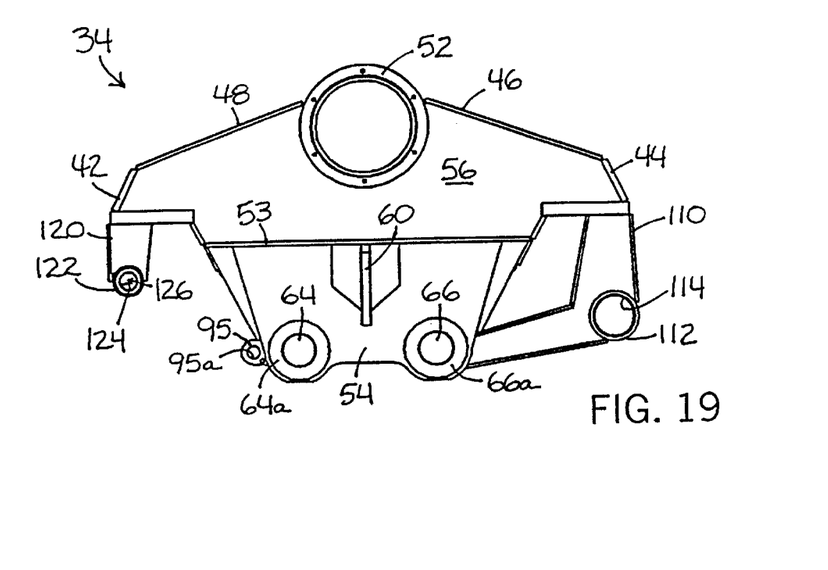
FIG. 19 is a rear elevational view of the frame of FIG. 13.

Frame 34 further includes a leading idler axle support arm 120 depending from front end panel 42. Referring to FIGS. 5 and 12a–12b, leading idler axle support arm 120 has a generally tubular terminal end 122 having an inner surface 124 defining a passageway 126 therethrough. Leading idler axle support 130 is pivotally mounted to leading idler support arm 120 by mounting pin 132 extending through passageway 126 in terminal end 122. Leading idler axle support 130 includes a leading idler axle passageway 134 for allowing leading idler axle 136 to pass therethrough. Leading idler axle 136 includes a notch 136a formed therein for allowing piston shaft 139 of cylinder 142 to extend therepast.

As is conventional, leading idler axle 136 supports leading idler wheels 137 on opposite ends thereof. Leading idler wheels 137 are mounted on rims 138 which, in turn, are mounted on corresponding ends of leading idler axle 136 in a conventional manner for rotational movement therewith. It is contemplated to provide bearings 141 between rims 138 and corresponding ends of leading idler axle 136 to facilitate rotation of leading idler wheels 137 thereabout. Leading idler wheels 137 include a radially outer surface 137a for engaging the inner surface 28 of flexible track 15.

Figure 6:
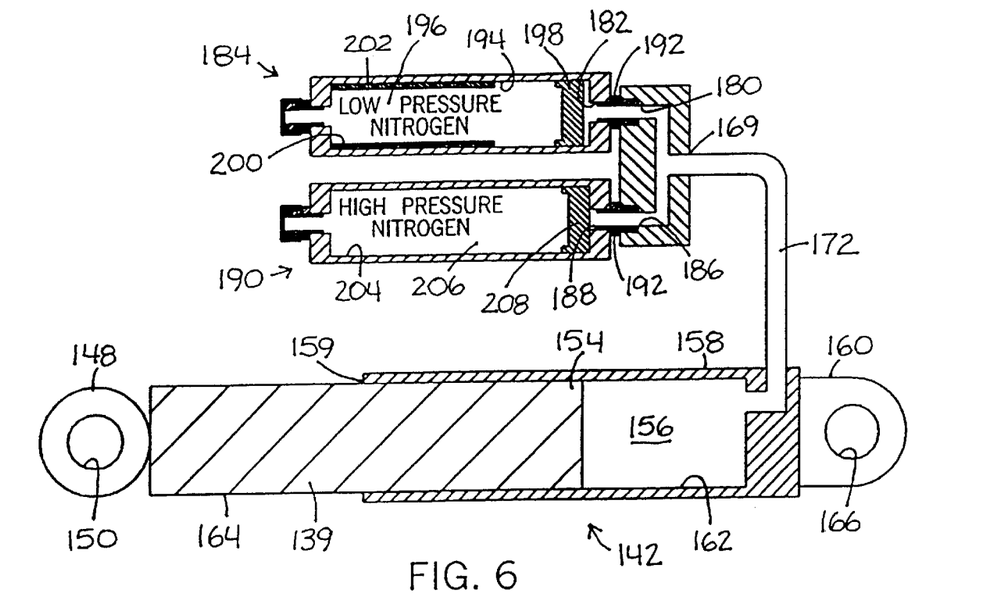
FIG. 6 is a schematic view of a belt tensioning device for the track system in a first extended position.
Figure 7:
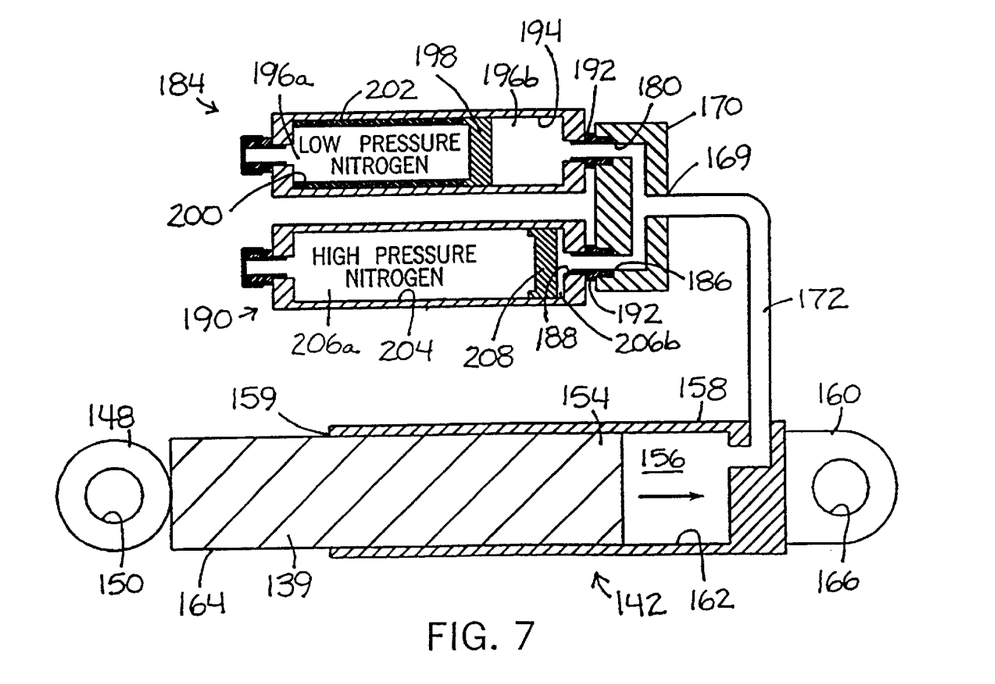
FIG. 7 is a schematic view of a belt tensioning device for the track system in a second intermediate position.
Figure 8:
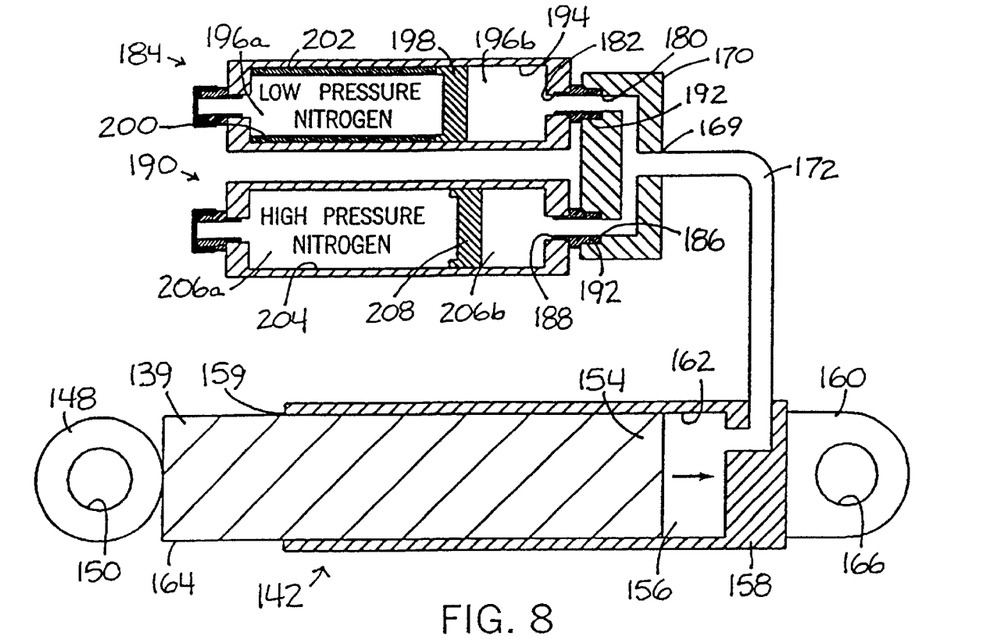
FIG. 8 is a schematic view of a belt tensioning device for the track system in a third retracted position.

Leading idler axle support 130 further includes a first and second piston mounting ears 140a and 140b depending therefrom. Each mounting ear 140a and 140b includes a corresponding aperture 142a and 142b, respectively, therethrough to accommodate piston shaft mounting pin 144. Apertures 142a and 142b in piston shaft mounting ears 140a and 140b, respectively, are axially aligned. Piston shaft mounting ears 140a and 140b define a piston receipt cavity 146 therebetween for receiving terminal end 148 of piston shaft 139. As best seen in FIGS. 6–8, terminal end 148 of piston shaft 139 includes an opening 150 for receiving mounting pin 144 such that piston shaft 139 of cylinder 142 may pivot on mounting pin 144.

Referring to FIGS. 6–9, piston shaft 139 includes a second opposite end 154 received within chamber 156 within cylinder housing 158 of cylinder 142. Cylinder housing 158 includes a first open end 159 for allowing piston shaft 139 to be inserted within chamber 156 and an opposite closed end 160. Inner surface 162 of cylinder housing 158 forms a slidable interface with the outer surface 164 of piston shaft 139. Closed end 160 of cylinder housing 158 includes a dog ear having an opening 166 passing therethrough. Closed end 160 of cylinder housing 158 is positioned between mounting flanges 95 and 97 such that opening 166 in closed end 160 is aligned with openings 95a and 97a in mounting flanges 95 and 97, respectively. Pin 168 extends through openings 97a and 99a in mounting flanges 97 and 99, respectively, and through opening 166 in closed end 160 of cylinder housing 158 so as to pivotally connect cylinder 142 to frame 34.

Figure 4:
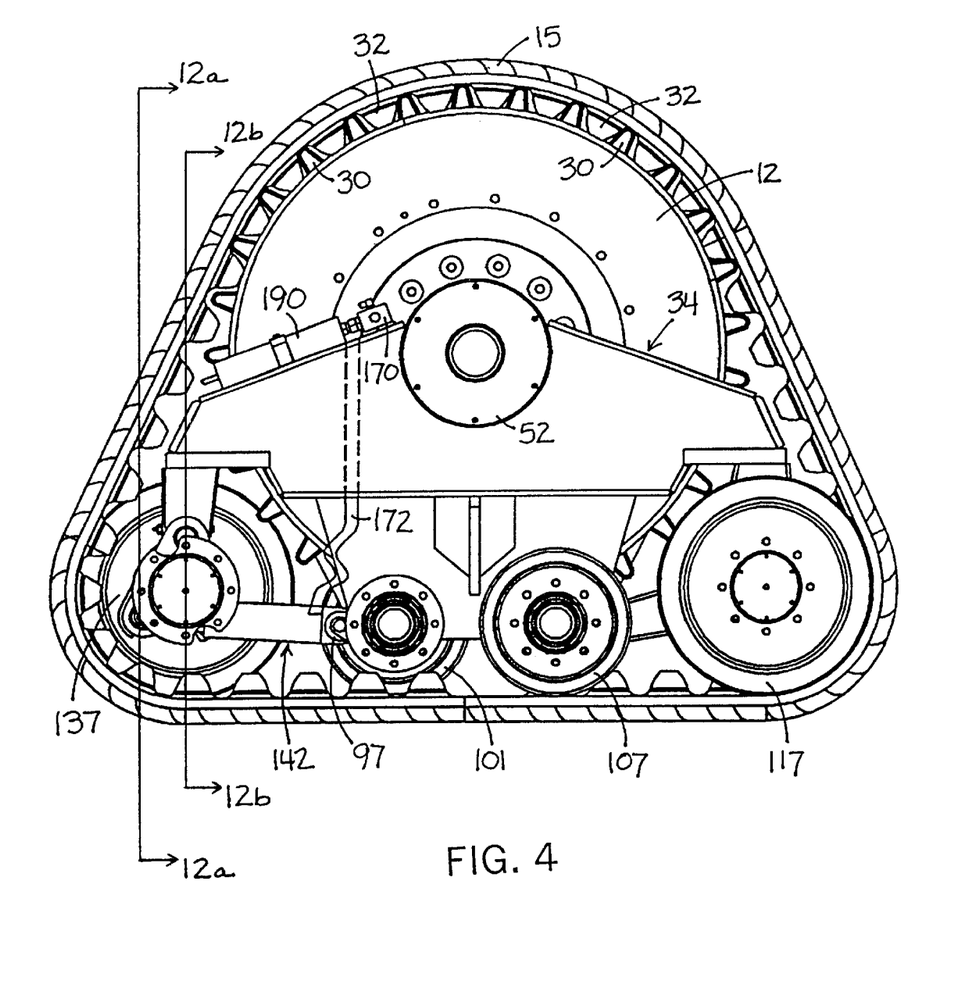
FIG. 4 is a front elevational view of the track system of FIG. 2.

Referring once again to FIGS. 6–8, chamber 156 within cylindrical housing 158 communicates with input 169 of manifold 170 through conduit 172. As best seen in FIG. 4, conduit 172 extends through opening 174 in lower panel 53 of side portion 36 of frame 34 and through opening 176 in upper panel 48 of side portion 36 of frame 34. In a preferred embodiment, manifold 170 is mounted to upper surface 178 of upper panel 48. Manifold 170 includes a first output 180 operatively connected to the input 182 of low pressure cylinder 184 and a second output 186 operatively connected to the input 188 of high pressure cylinder 190. Seals 192 are provided between the outputs 180 and 186 of manifold 170 and the inputs 182 and 188 of cylinders 184 and 190, respectively, to maintain the integrity of the connections therebetween.

Cylinder 184 includes an inner surface 194 defining a chamber 196 therein. A piston 198 is slidably received within chamber 196 so as to divide chamber 196 into a first portion 196a for receiving low pressure nitrogen gas therein and a second portion 196b which communicates with chamber 156 within cylinder housing 158 through manifold 170 and conduit 172. A generally tubular limiter member 200 is positioned within chamber 196. Limiter member 200 includes an outer surface 202 which engages the inner surface 194 of cylinder 184. Limiter member 200 limits movement of piston 198 such that piston 198 is slidable between a first position, FIG. 6, and a second position, FIGS. 7 and 8.

Cylinder 190 includes an inner surface 204 defining a chamber 206 therein. A piston 208 is slidably received within chamber 206 so as to divide chamber 206 into a first portion 206a for receiving a high pressure nitrogen gas therein and a second portion 206b which communicates with chamber 156 within cylinder housing 158 through manifold 170 and conduit 172. It is contemplated to provide a fluid within chamber 156 of cylinder housing 158, conduit 172, manifold 170, and second portions 196b and 206b of chambers 196 and 206, respectively, in cylinders 184 and 190, respectively.

As described, as piston shaft 139 moves into chamber 156 of cylinder housing 158, from left to right in FIGS. 6–8, fluid is urged from chamber 156 through conduit 172 into manifold 170. Given that the first portion 196a of chamber 196 of cylinder 184 is filled with a low pressure nitrogen gas and that the first portion 206a of chamber 206 of cylinder 190 is filled with a high pressure nitrogen gas, the fluid within manifold 170 will take the path of least resistance and urge piston 198 within chamber 196 from right to left in FIGS. 6–8 against the bias of the low-pressure nitrogen gas in first portion 196a of chamber 196 in cylinder 184. Travel of piston 198 within chamber 196 is terminated when piston 198 engages limiter member 200, FIG. 7, which corresponds to a predetermined distance X which piston shaft 139 is inserted into chamber 156 of cylinder housing 158, FIG. 9. Thereafter, as piston shaft 139 is further inserted into chamber 156 of cylinder housing 158, the fluid within manifold 170 will attempt to urge piston 208 against the force of the high pressure nitrogen gas present in first portion 206a of chamber 206 of second cylinder 190, FIG. 9.

Figure 9:
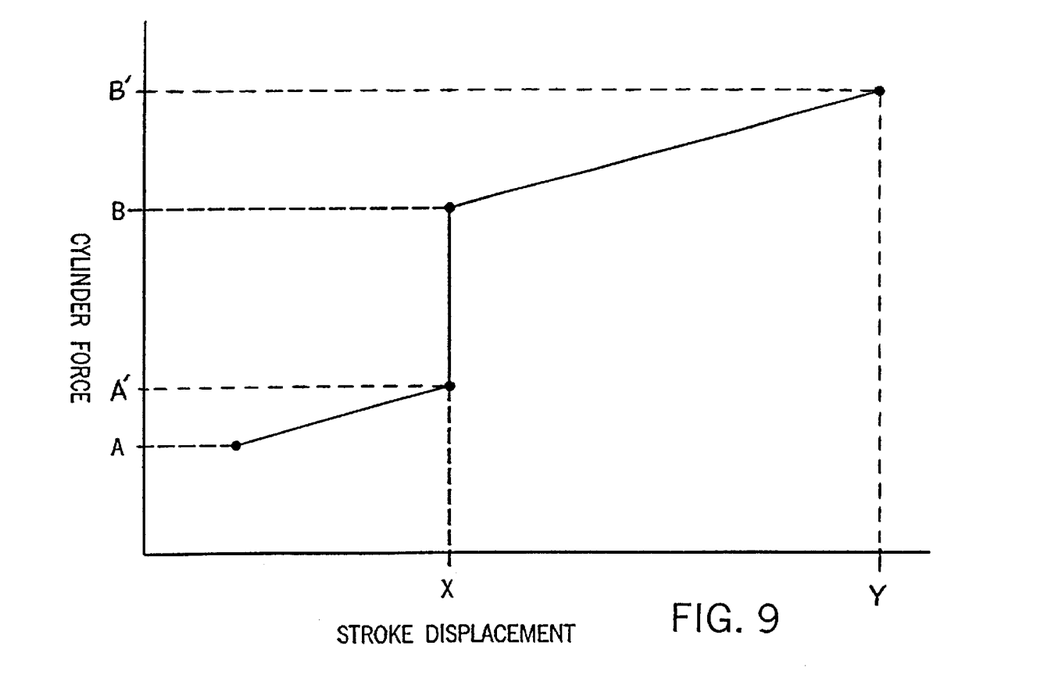
FIG. 9 is a graphical representation of the displacement of the belt tensioning device in response to the force thereon.
Figure 10:
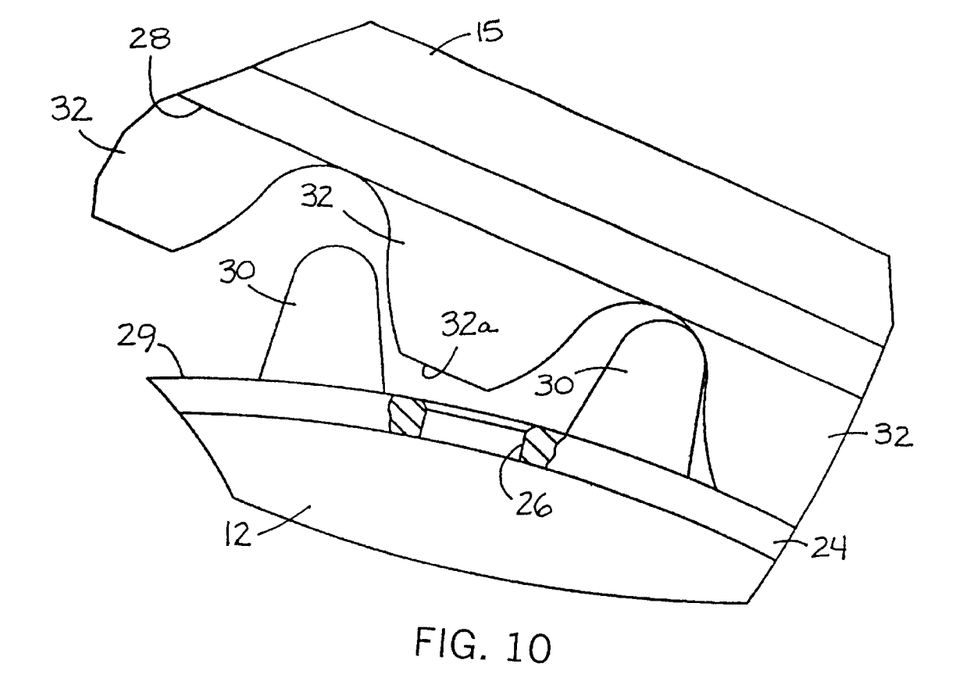
FIG. 10 is an enlarged, side elevational view, partially-in-section, of a portion of the track system of FIG. 2 showing engagement of the flexible track with the drive wheel.
Figure 11:
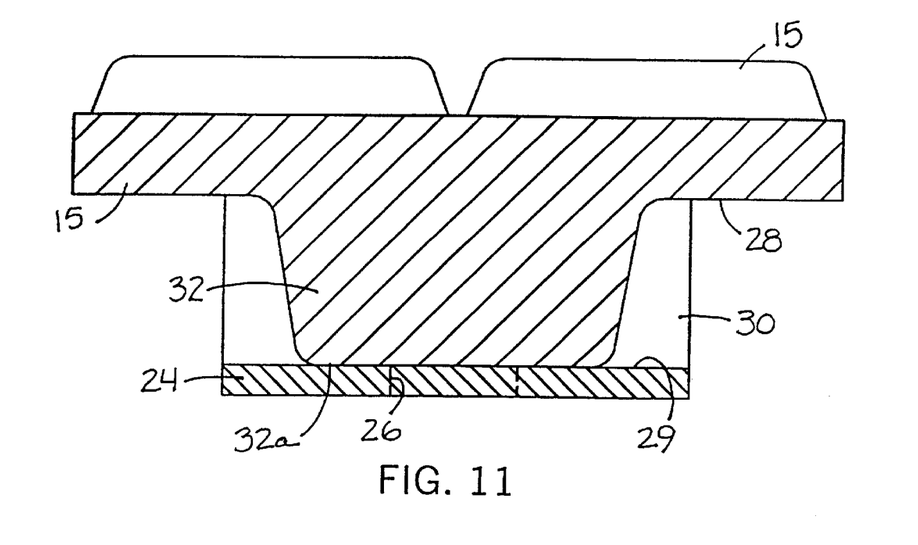
FIG. 11 is a cross-sectional view of a portion of the track system of FIG. 2 showing engagement of the flexible track with the drive wheel.

Referring to FIG. 9, as described, the amount of force necessary to insert piston shaft 139 a predetermined distance within chamber 156 of cylinder housing 158 gradually increases from an initial value A to an increased value A' as the low pressure nitrogen gas is compressed in first portion 196a of chamber 196 in cylinder 184 by piston 198 being urged from the first to the second position by the fluid. Thereafter, the amount of force necessary to further insert piston shaft 139 a second predetermined distance Y-X within chamber 156 of cylinder housing 158 gradually increases from an initial value B to an increased value B'. Since the nitrogen gas within cylinder 190 is under greater pressure than the nitrogen gas within cylinder 184, a substantial greater force is required for piston shaft 139 to travel the predetermined distance Y-X than the initial predetermined distance X.

In operation, track system 10 is mounted to an axle of a vehicle through drive wheel 12 as heretofore described. The axle of the vehicle is rotated in a conventional manner through the vehicle by its engine and through a transmission which can vary the speeds and allow for forward and reverse rotation. Flexible track 15 of track apparatus 10 is positioned over drive wheel 12 such that lugs 32 projecting from the inner surface 28 of flexible track 15 are received between corresponding pairs of drive lugs 30 projecting from outer surface 29 of outer rim 24 of drive wheel 12. It is intended terminal end surface 32a of such lugs 32 engage outer surface 29 of outer rim 24 of drive wheel in order that lugs 32 are supported when driven by drive wheel 12, thereby minimizing the possible twisting and turning of lugs 32, and hence, damage to lugs 32 during operation of track system 10. As drive wheel 12 rotates, drive lugs 30 engage corresponding lugs 32 and drive flexible track 15 about drive wheel 12. Thereafter, successive drive lugs 30 engage subsequent lugs 32 extending from the inner surface 28 of flexible track 15 so as to drive flexible track 15 about drive wheel 12.

As flexible track 15 approaches leading idler wheels 137, lugs 32 pass therebetween. In addition, the radially outer surfaces 137a of leading idler wheels 137 engage the inner surface 28 of flexible track 15 and direct the lower length of flexible track 15 into contact with a supporting surface such as a farmer's field. As flexible track 15 continues to be driven about drive wheel 12, lugs 32 pass between the pairs of leading and trailing bogie wheels 101 and 107, respectively. As previously described, the radially outer surfaces 101a and 107a of bogie wheels 101 and 107, respectively, engage the inner surface 28 of flexible track 15 along its lower length and insure contact of flexible track 15 with the supporting surface along the lower length of flexible track 15. Similarly, as flexible track 15 approaches trailing idler wheels 117, lugs 32 on the inner surface 28 of flexible track 15 pass therebetween. The radially outer surfaces 117a of idler wheels 117 engage the inner surface 28 of flexible track 15 and guide flexible track 15 onto drive wheel 12 to form a continuous loop.

It is contemplated as being within the scope of the present invention to rotate drive wheel 12 in a second, opposite direction such that trailing idler wheels 117 may function as leading idler wheels, and such that leading idler wheels 137 may function as trailing idler wheels as heretofore described.

In order to maintain the proper tension on flexible track 15 so as to prevent slippage of flexible track during travel about drive wheel 12, piston shaft 139 of cylinder 142 is provided. It is heretofore described, the nitrogen gas in the first portions 196a and 206a of chambers 196 and 206, respectively, of corresponding cylinders 184 and 190, respectively, urge corresponding pistons 198 and 208 towards the first position. As a result, the fluid in chamber 156 of cylinder housing 158 urges piston shaft 139 therefrom. Piston shaft 139, in turn, urges the outer surfaces 137a of leading idler wheels 137 into contact with the inner surface 28 of flexible track 15 through connection with leading idler axle support 130 so as to maintain proper tension on flexible track 15.

In the event that flexible track 15 engages an obstruction on the supporting surface during operation of track system 10, such obstruction may cause flexible track 15 to deflect thereby causing leading idler axle support 130 to pivot on mounting pin 132 and to urge piston shaft 139 into chamber 156 of cylinder housing 158 through leading idler wheels 137 and leading idler axle 136. The amount of force necessary to insert the piston shaft 139 into chamber 156 of cylinder housing 158 (in other words, the amount of force necessary to allow flexible track 15 to deflect) gradually increases as piston shaft 139 is further inserted into chamber 156, as heretofore described. Once track system 10 clears the obstruction, the piston shaft 139 is urged back into its original position by the nitrogen gas in first portions 196a and 206a of chambers 196 and 206, respectively, in corresponding cylinders 184 and 190, respectively, so as to once again provide the proper tension on flexible track 15.

As described, the structure of track system 10 allows for deflection of the flexible track in response to obstructions or the like while maintaining the proper tension thereon. It can be appreciated that the tension on the flexible track may be adjusted by varying the pressure of the nitrogen gas in first portions 196a and 206a of chambers 196 and 206, respectively, in corresponding cylinders 184 and 190, respectively, and/or by varying the position of limiter member 200.

Various modes of carrying out the invention are contemplated as being within the scope of the following claims particularly pointing out and distinctly claiming the subject matter as regarded as the invention.

We claim:

1. A drive wheel engaged with the flexible track of a track apparatus, the drive wheel mountable on a vehicle axle, the flexible track having a main inner surface and spaced lugs projecting therefrom, each lug terminating in a distal surface spaced inwardly from the main inner surface, the drive wheel comprising:

a central hub portion mountable on the axle for rotational movement therewith;

a radially-extending portion terminating in a circumferential edge; and a peripheral portion affixed to the circumferential edge and having outwardly-facing lug-engagement surfaces positioned for engagement with the distal surfaces of the track lugs and a plurality of spaced openings for allowing debris to pass through the peripheral portion.

2. The drive wheel of claim 1 wherein the peripheral portion includes an outer rim forming the outwardly-facing lug-engaging surfaces.

3. The drive wheel of claim 2 wherein the outer rim includes the plurality of spaced openings therein.

4. The drive wheel of claim 3 wherein the plurality of openings in the outer rim are circumferentially spaced about the central hub.

5. The drive wheel of claim 1 further comprising a plurality of circumferentially-spaced drive members projecting radially from the outer rim.

6. A drive wheel engaged with the flexible track of a track apparatus, the drive wheel having a drive axis and being mountable on a vehicle axle, the flexible track having a main inner surface and spaced track lugs projecting therefrom, each lug terminating in a distal surface spaced inwardly from the main inner surface, the drive wheel comprising:

a central mounting portion mountable on the axle for rotational movement therewith;

a radially-extending portion terminating in a circumferential edge; and a peripheral portion affixed to the circumferential edge and having (a) radially-projecting drive members defining lug-receiving gaps therebetween and (b) outwardly-facing lug-engagement surfaces within the lug-receiving gaps in position for engagement with the distal surfaces of the track lugs, the outwardly-facing lug-engagement surfaces being substantially convex.

7. The drive wheel of claim 6 wherein the peripheral portion includes an outer rim forming the outwardly-facing lug-engaging surfaces, the rim including a plurality of spaced opening therein.

8. The drive wheel of claim 6 wherein each lug-engagement surface extends in an axial direction parallel to the drive axis such that each lug-engagement surface is a portion of a cylinder.

9. The drive wheel of claim 6 wherein the outer rim engages the distal surfaces of the lugs when the lugs are received in the lug-receiving gaps.

10. The drive wheel of claim 6 wherein the drive wheel is substantially free of side structure in positions which are laterally adjacent to the lug-engagement surfaces between adjacent pairs of the drive members and radially beyond the circumferential edge, whereby the track lugs are free to adjust their precise positions of engagement with the lug-engagement surfaces.

11. A track apparatus mountable on a rotatable axle of a vehicle, comprising:

a continuous flexible track having a main inner surface and spaced track lugs projecting therefrom, each track lug terminating in a distal surface spaced inwardly from the main inner surface; and a drive wheel having (a) a central hub portion mountable on the axle for driving the flexible track about the axle, (b) a radially-extending portion terminating in a circumferential edge, and (c) a peripheral portion affixed to the circumferential edge and having ($c_1$) radially-projecting drive members defining lug-receiving gaps therebetween and ($c_2$) outwardly-facing lug-engagement surfaces within the lug-receiving gaps in position for engagement with the distal surfaces of the track lugs, the drive wheel being substantially free of side structure in positions which are laterally adjacent to the lug-engagement surfaces between adjacent drive members and radially beyond the circumferential edge thereby providing the track lugs freedom to adjust their precise positions of engagement with the lug-engagement surfaces.

12. The track apparatus of claim 11 wherein the peripheral portion includes an outer rim forming the outwardly-facing lug-engaging surfaces.

13. The track apparatus of claim 12 wherein the outer rim includes a plurality of spaced openings therein.

14. The track apparatus of claim 11 wherein the outer rim engages the distal surfaces of the lugs when the lugs are received in the lug-receiving gaps.

* * * * *